Figure 1:
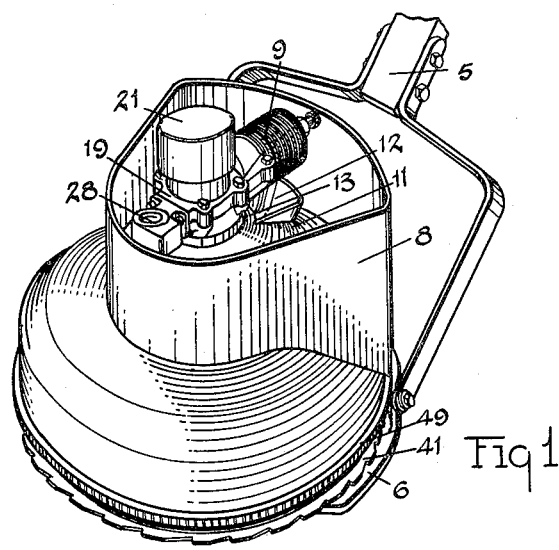

June 21, 1938. B. H. URSCHEL 2,121,749
MOWER
Filed May 7, 1936 9 Sheets-Sheet 1

Inventor
Bertis H. Urschel
By Faust F. Crampton
Attorney

June 21, 1938.　　　B. H. URSCHEL　　　2,121,749
MOWER
Filed May 7, 1936　　　9 Sheets-Sheet 2

Inventor
Bertis H. Urschel
By Faust F. Crampton
Attorney

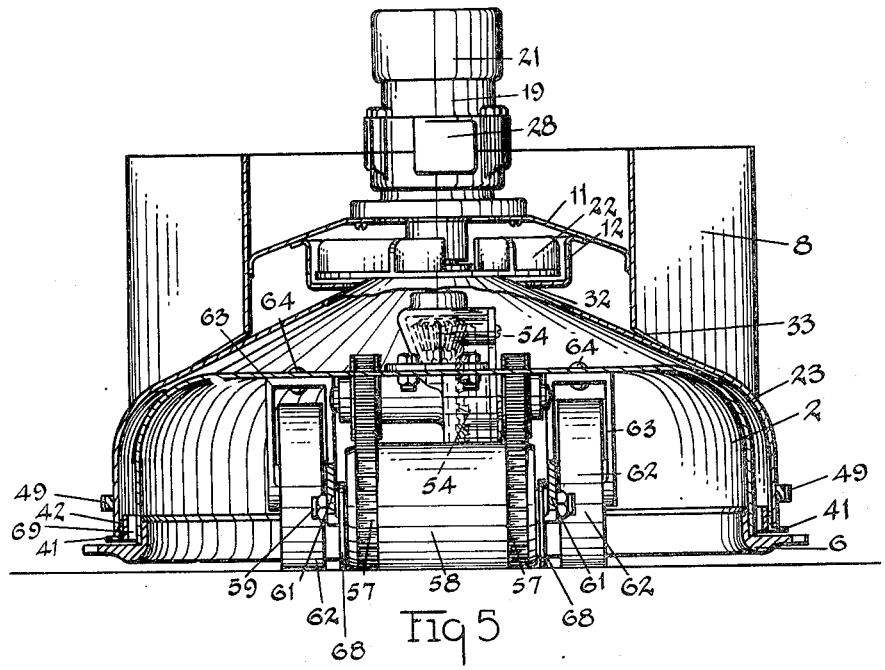

June 21, 1938.  B. H. URSCHEL  2,121,749
MOWER
Filed May 7, 1936   9 Sheets-Sheet 4
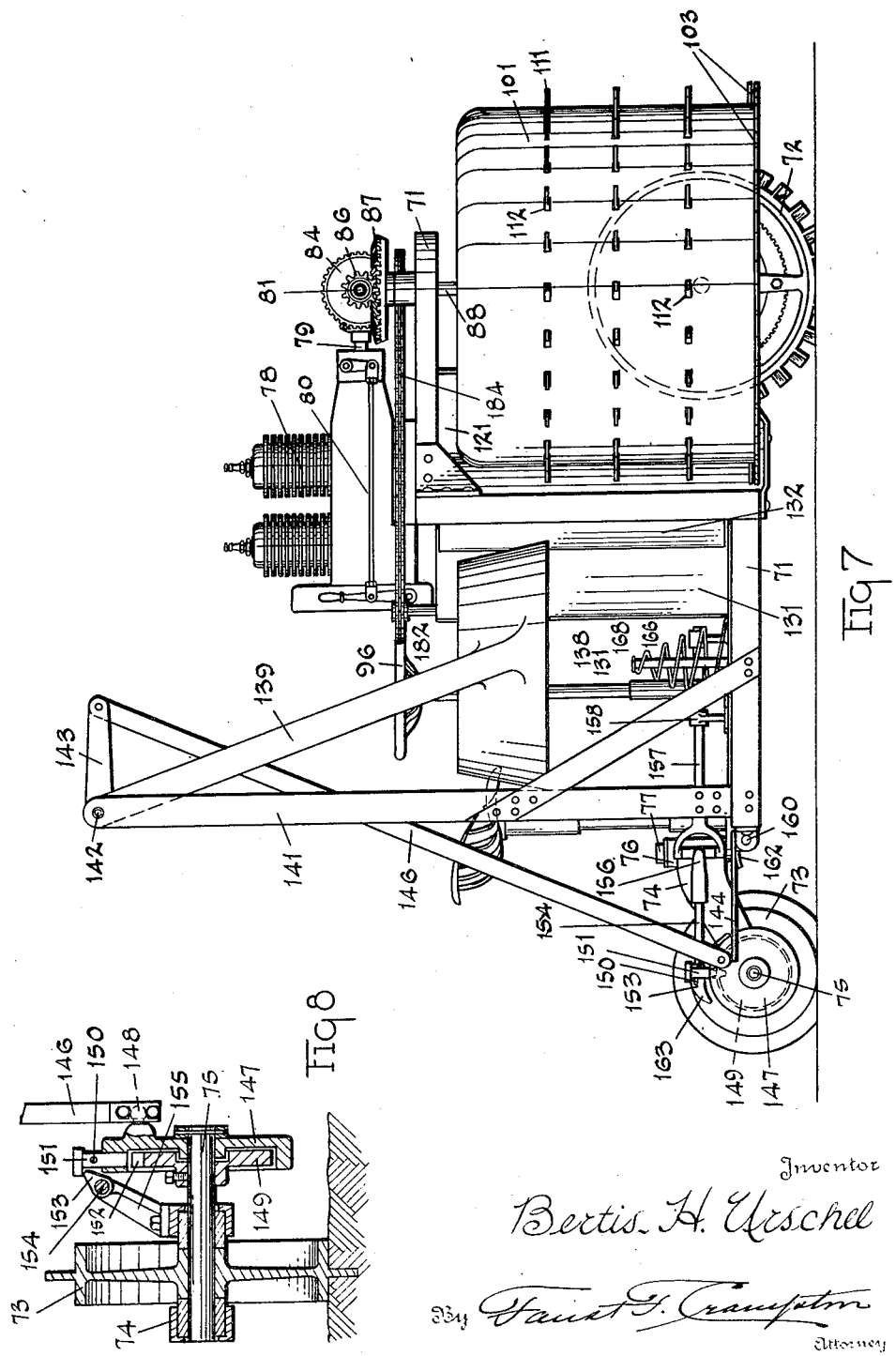
Inventor
Bertis H. Urschel
By [signature]
Attorney June 21, 1938.  B. H. URSCHEL  2,121,749
MOWER
Filed May 7, 1936  9 Sheets-Sheet 5

Inventor
Bertis H. Urschel
By Faust F. Crampton
Attorney

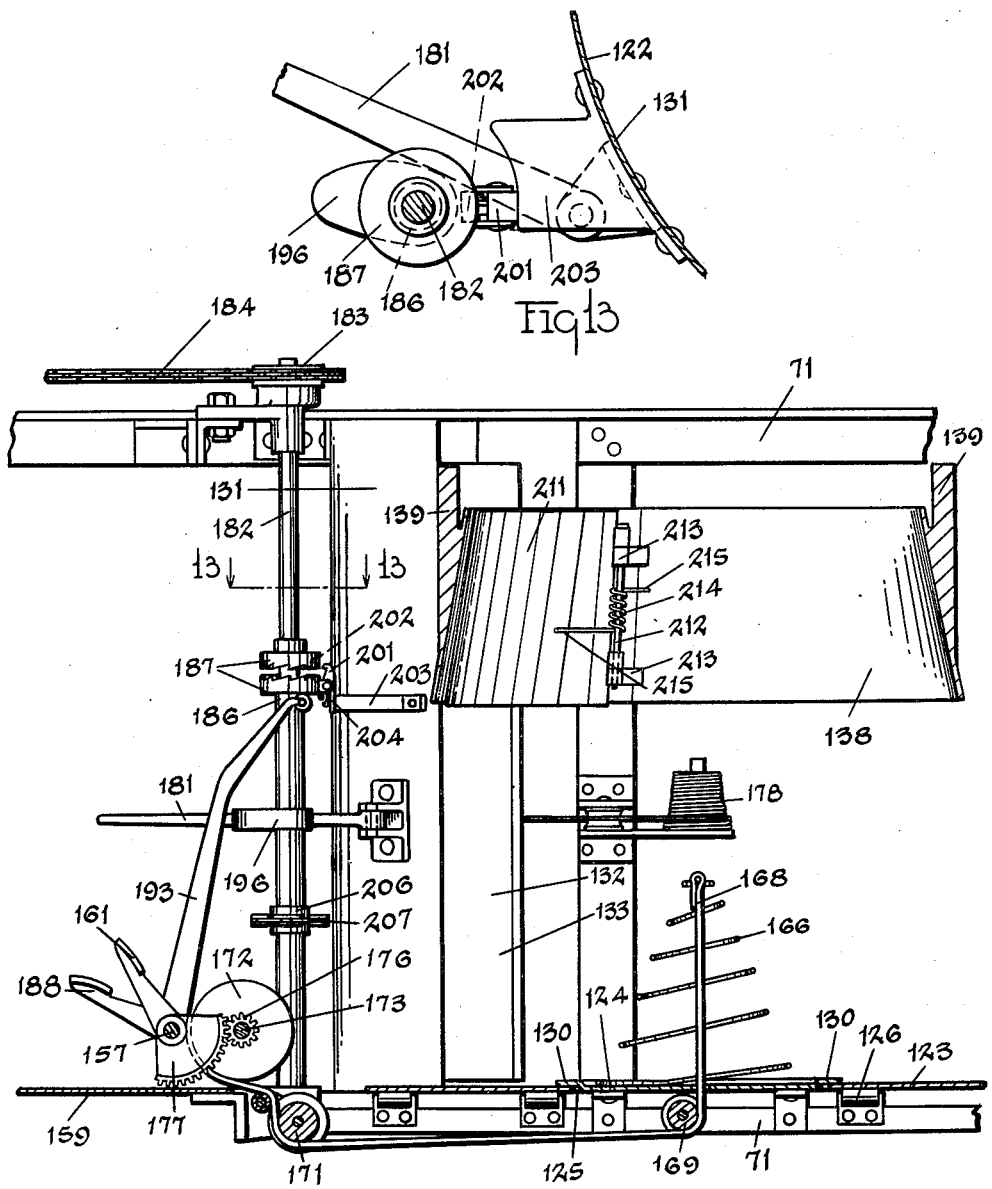

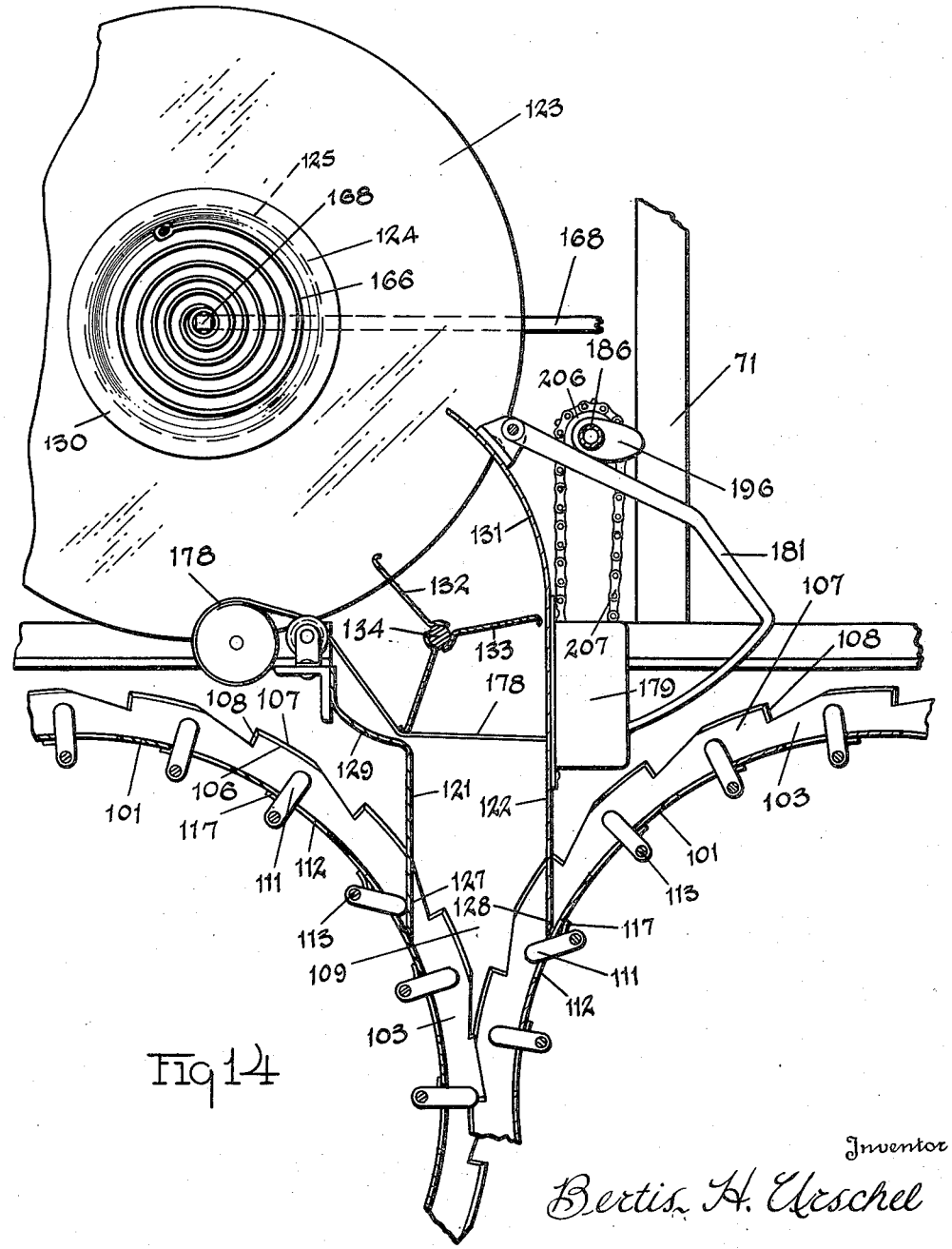

Patented June 21, 1938

2,121,749

UNITED STATES PATENT OFFICE 2,121,749

MOWER

Bertis H. Urschel, Bowling Green, Ohio, assignor to The Urschel Engineering Company, Bowling Green, Ohio, a corporation of Ohio Application May 7, 1936, Serial No. 78,297

17 Claims. (Cl. 56—255)

My invention relates to mowers or reapers for cutting lawn or cereal grasses.

The invention provides a grass cutting machine having a cutter member that cuts at a fixed distance from the ground level to leave all of the grass blades or stubble at a uniform height.

The invention also provides an enclosing or covering shell that affords a guard or protective means for the moving parts and prevents contact with and injury to other objects.

The invention also provides means for depositing the cut portions of the grass in windrows. It further provides means for delivering the grass from the machine and disposing the cut blades or stalks so that they extend in the direction of the windrows.

The invention also provides means for periodically discharging the collected cut portions of the blades and the stalks from the machine to produce piles of the grass.

The invention also provides a grass cutting machine having a rotatably driven annular cutter or blade, and means for conveying the grass transversely with the movement of the forward side of the cutter blade and deflecting the grass from its conveyed position to form windrows or to accumulate the cut grass and finally discharge the grass in piles.

The invention also provides means for maintaining the cut portions of the grass in its upright position and means for gathering the grass when in this position.

The invention also provides means for bundling and discharging bundles of the grass from the machine. It further provides means collecting and arranging the bundles to form cocks and a means for discharging the cocks from the machine.

The invention has for its object other features and advantages which will appear from the following description and upon examination of the drawings. To illustrate a practical application of the invention, I have selected a mower and a modified form of the invention, referred to as a reaper, to illustrate practical applications of the invention, it being understood that structures containing the invention may partake of different forms and may be varied in their details. The mower and reaper forms of the invention are illustrated in the accompanying drawings and are described hereinafter.

Figure 2:
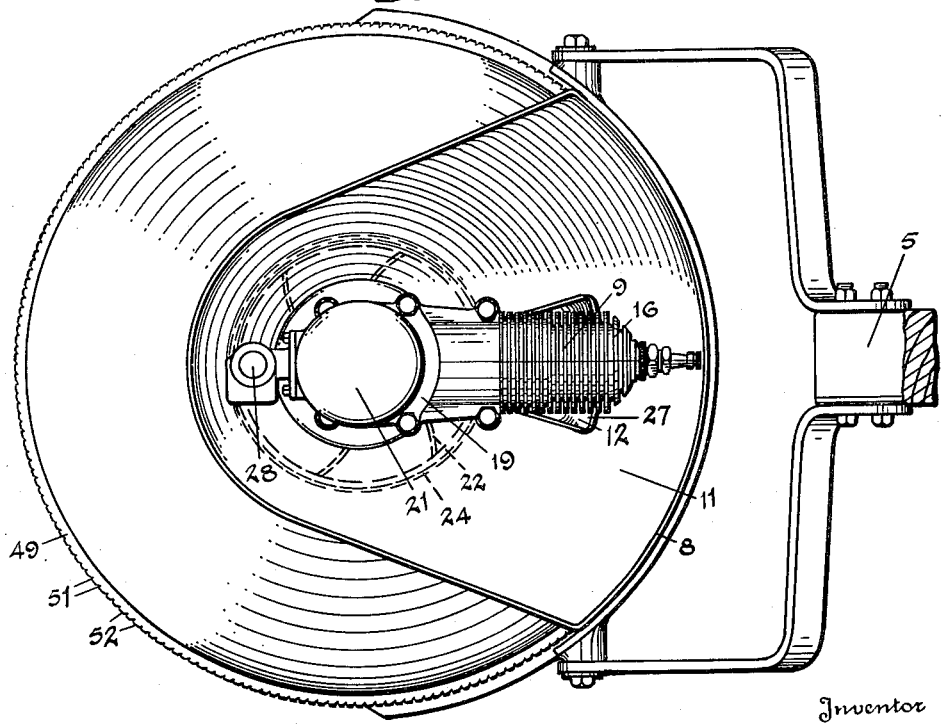
Figure 3:
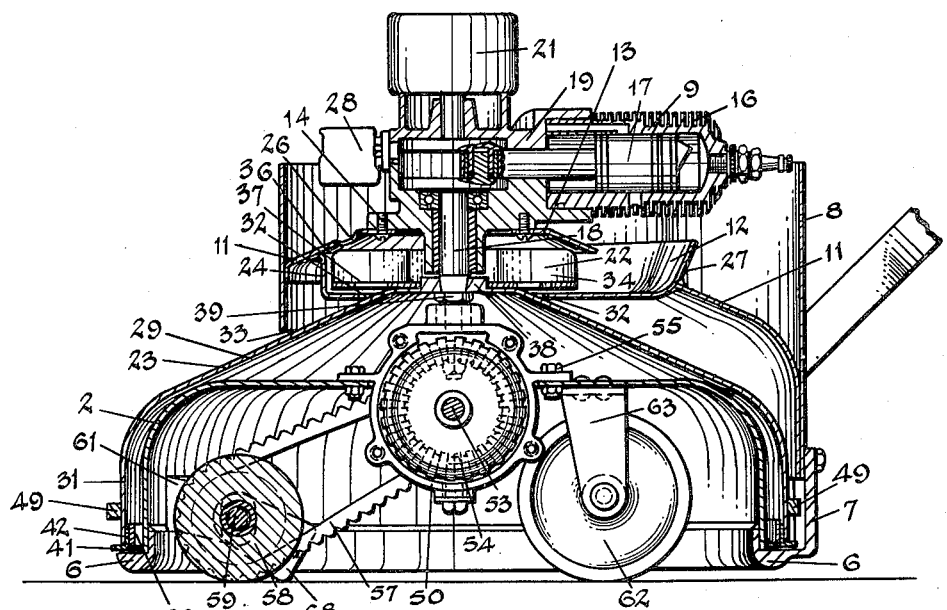
Figure 4:
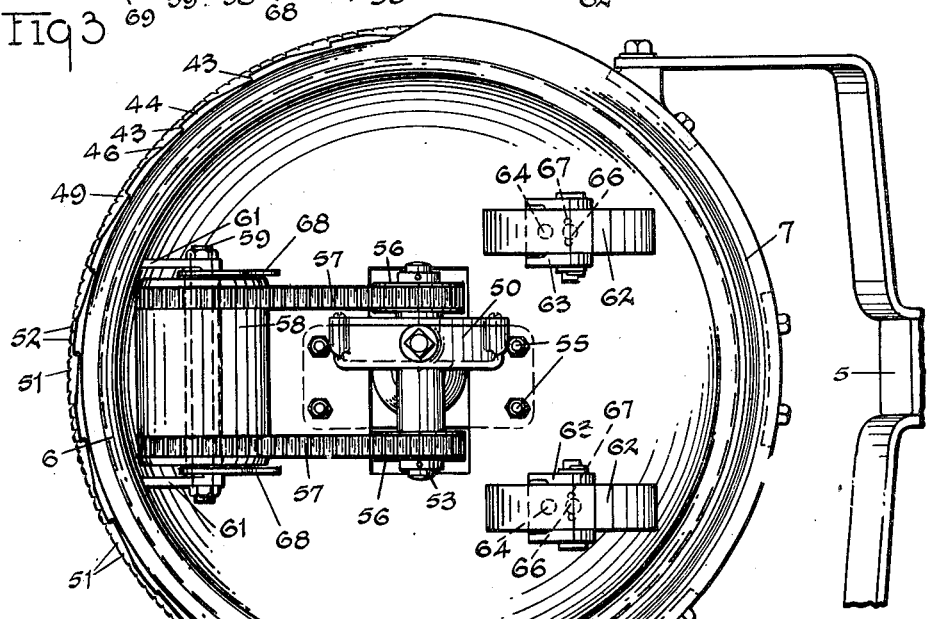
Figure 9:
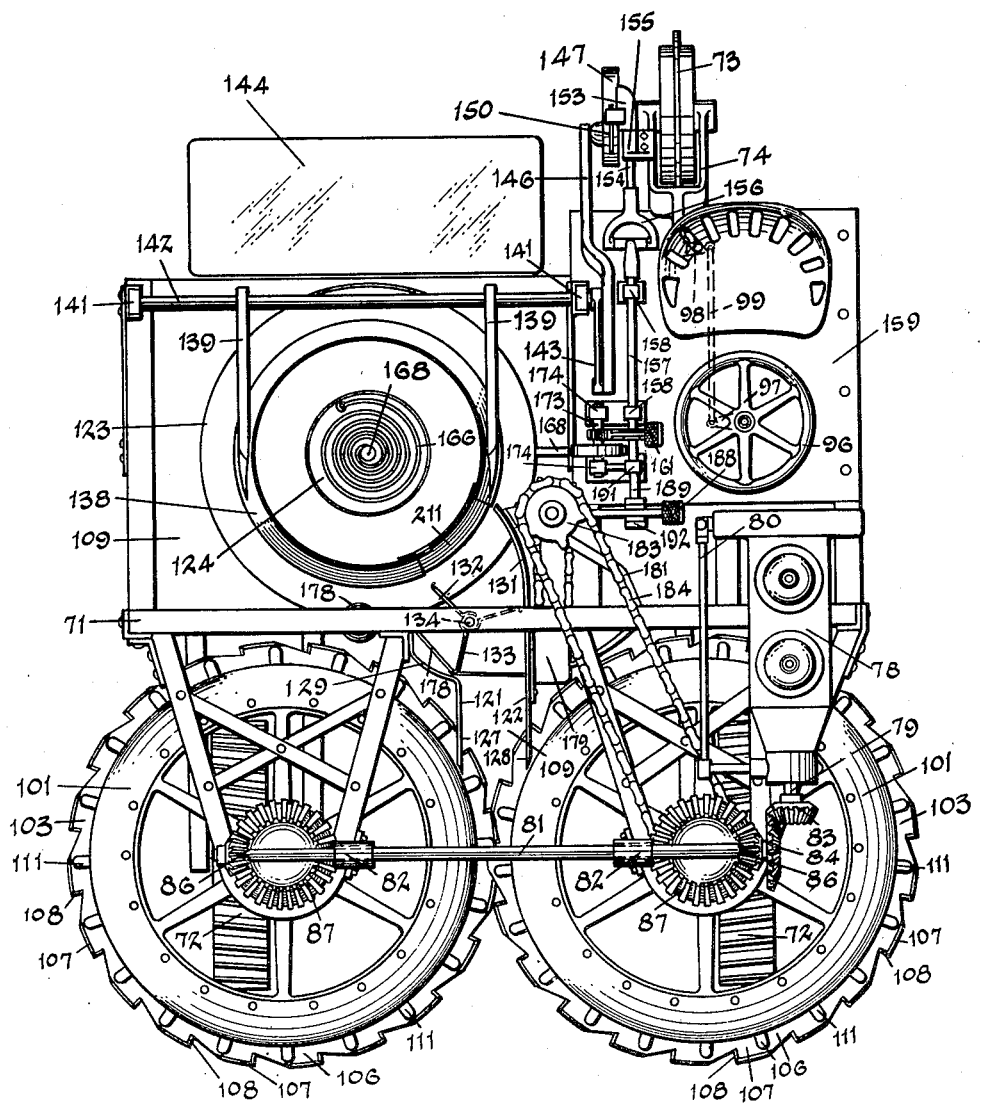
Figure 10:
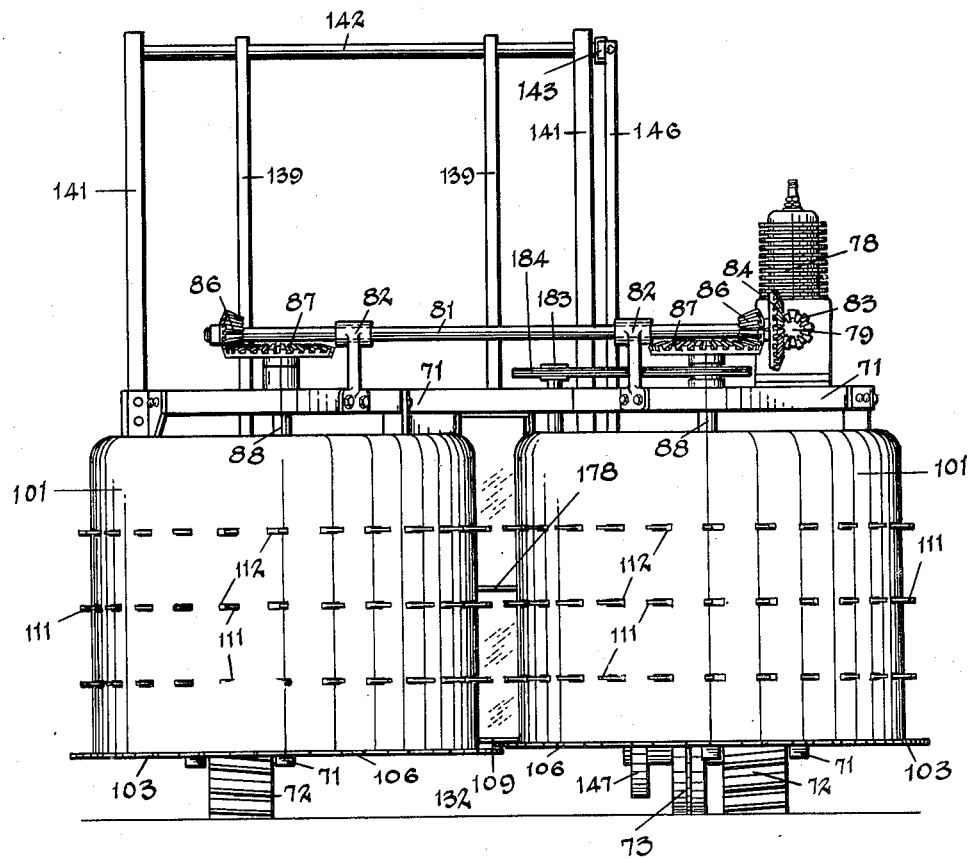
Figure 11:
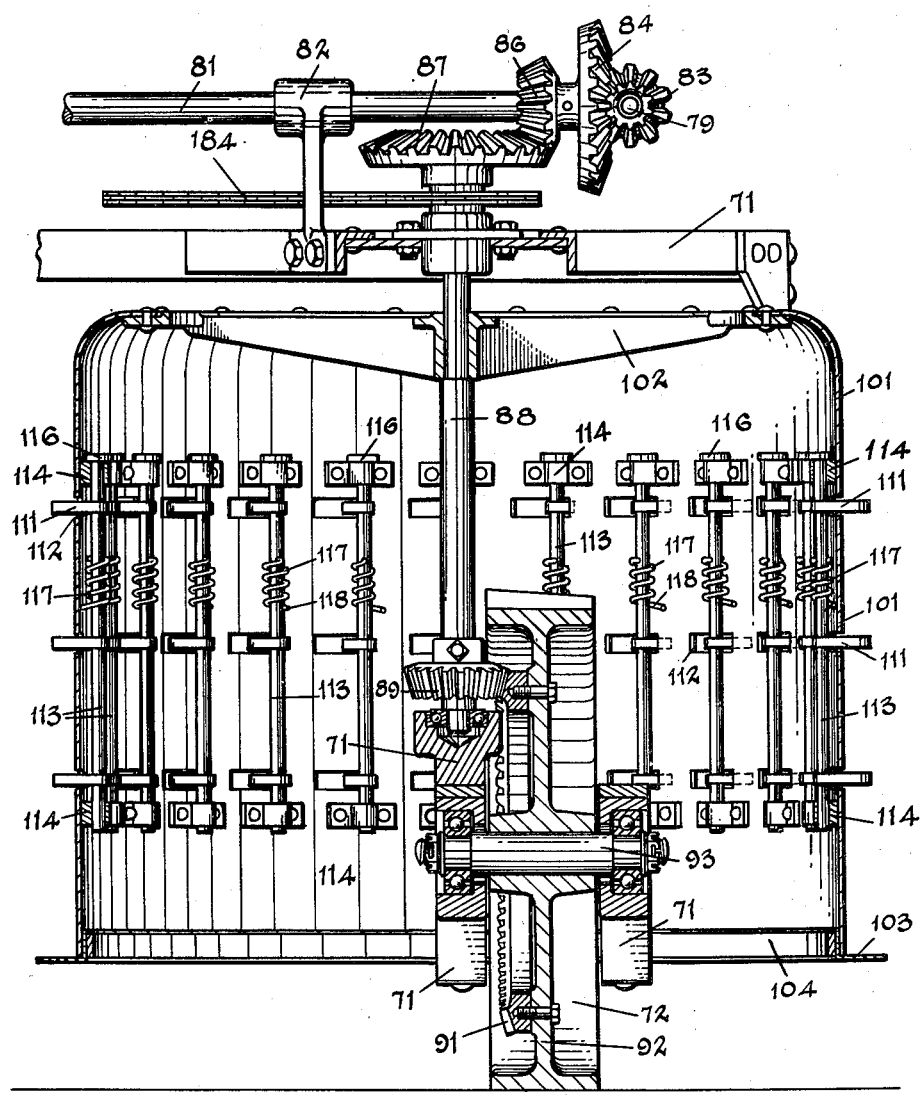

Fig. 1 illustrates a perspective view of the mower containing my invention. Fig. 2 is a top view of the mower shown in Fig. 1. Fig. 3 illustrates a view of a vertical section of the mower. Fig. 4 illustrates a view of the mower when inverted. Fig. 5 is a view of a section taken on a plane extending at right angles to the section shown in Fig. 3. Fig. 6 is an enlarged view showing a part of the cutter blade and parts contiguous thereto. Fig. 7 is a side view of the reaper form of the invention. Fig. 8 illustrates a part of the cock-forming and grass discharging means of the form shown in Fig. 7. Fig. 9 illustrates a top view of the reaper form of the invention. Fig. 10 illustrates a front view of the machine. Fig. 11 illustrates a view of a section of one of the shells, its cutter blade, and stalk holders. Fig. 12 illustrates the cock-forming parts of the machine. Fig. 13 illustrates a part of the bundle-forming mechanism. Fig. 14 illustrates a broken sectional view showing relative location of parts of the machine.

In the form of construction illustrated in Figs. 1 to 6, the supporting body of the mower consists of a sheet metal shell 2 mounted on rollers or wheels. A suitable motor is supported on the shell, and connected to the moving parts for operating the mower. The shell 2 is of the form of an inverted pan that encloses or covers the supporting roller and wheels. The lower edge is provided with a circular guard 6 of relatively thick metal that may be welded to the edge of the shell 2. It is provided with an upwardly extending flange 7 extending along a semi-circular rear edge part of the shell 2. The guiding handle bar 5 is pivotally connected to the flange 7.

A sheet metal housing 8, substantially segmental in form with respect to the circle of the guard 6, surrounds a major portion of the motor 9 and its mechanism. The motor 9 is mounted and secured by bolts 14 on a substantially segmental plate 11, which forms the bottom of the housing 8. The edge parts of the plate 11 are welded to the inner surfaces of the housing 8. An air deflector part 13 of the plate 11 is struck up from the plate to receive a pan 12 having an end part 24 welded to the plate 11. The struck-up part 13 over-hangs an end part 24 of the pan 12, for directing air with respect to a motor fan located within the pan, one side of the plate 13 has openings 26 for directing air to the motor fan and an edge part that coacts with the sides of an end part 27 of the pan to direct the air toward the cylinder of the internal combustion engine 9.

The cylinder is provided with suitable fins 16 for air cooling the cylinder. Its piston 17 is eccentrically connected to the shaft 18 which is provided with suitable bearings in the frame 19.

The axis of the engine is preferably located horizontally and substantially in the plane of the upper edge of the housing 8. A suitable carburetor 28 may also be connected to the frame 19 of the engine for supplying gasoline vapor to the engine as required. One end of the shaft 18 is connected to a suitable timer 21, and the other end of the shaft is connected to a blower or fan 22 and to a sheet metal shell 23.

The upper end portion 29 of the shell 23 is formed conical and its lower end portion 31 is formed cylindrical. The upper end of the conical portion 29 extends through an opening 32 formed in the bottom of the pan 12. The shell 23 is located beneath a major portion of the edge of the plate 11 of the housing 8 and is spaced therefrom to form an opening 33. The blades 34 of the fan 22 may be secured to a disc 36, and the disc 36 may be provided with a plurality of openings 37. Thus on rotation of the fan 22, air will be drawn through the openings 26 of the plate 11, the openings 33, the opening 32 formed in the pan 12, and the openings 37 formed in the disc 36, and directed by the fan into a large end part 27 of the pan 12, the side of the end 27 of the pan operating to direct the air towards the fins 16 of the engine during the rotation of the shell 23.

The shell 23 is welded centrally to a hub 38 and through the hub 38 is connected to the shaft 18 by a suitable threaded portion and a nut 39. The cylindrical portion of the outer shell 23 surrounds and is located coaxially with respect to the shell 2. A circular cutting blade 41 having an L-shaped cross section is pressed into the end of the shell 23. The flange part 42 of the blade extends vertically and is formed cylindrically and substantially fits the lower edge portion of the shell 23. A reinforcing ring 40 may be forced within the blade 41 to distend the flange of the blade to tightly and yet removably secure the blade in the end of the shell 23. The blade 41 extends horizontally and protrudes from the lower edge of the shell 23 only a short distance, such as a quarter of an inch. It extends along the semi-circular, forward part of the guard 6 and but a short distance beyond the guard, such as about one eighth of an inch. The edge part of the blade 41 is cut back to form radially extending edge parts 43 that are sharpened. The circular portions 44 are also sharpened and form cutting edges. The intermediate portions 46 slope inwardly from the following ends of the circular extending portions 43. Preferably the sloping portions 46 are not sharpened and operate to release and guide the grass to the radially cutting edge portions 43 as the machine is moved forward. Thus, the radially extending cutting portions 43 insure the cutting of the grass that is not cut by the circular edge portions 44.

The edge of the guard 6 has substantially the same radius or slightly less than that of the corners formed between the cutting edge parts 43 and the edge portions 46 of the blade, while the flange 7 extends from the rearward semi-circular part of the guard 6 to completely enclose the rear part of the edge of the blade.

In the operation of the motor, the circumferential speed is such as to produce not only an edge cut, as distinct from a saw cut, by the sharpened edge portions 44 of the blade, but also a transverse whip-cut by the radially extending edge portions 43 thereby insuring not only cutting of the grass blades, but also cutting of stalks of grass that may exist, such as where lawn grass has been allowed to grow toward seed producing lengths. The circumferential speed also is such as to cut the grass according to the forward movement of the lawn mower as produced by the motor. The circumferential speed, however, is such as to prevent throwing of the grass from the surface of the shell 23. As the grass is cut, the lower ends of the cut portions slide onto the protruding edge part of the blade and the cut portions are brought into contact with the cylindrical vertically extending surface 31 of the shell 23, and by the forward movement of the mower, the grass is maintained in its upright position, until the end edge part 48 of the flange 7 is reached where some of the grass collects. The part 48 thus operates to cause the grass to be deflected from the cylindrical part of the shell 23 to deposit the grass in the form of a windrow at one side of the swath cut by the mower. As the grass is discharged from the machine, the grass blades are drawn or deposited lengthwise in the direction of the windrow thus formed.

To produce a further protection against injury from contact with the blade, a ring 49 may be, if desired, secured to the cylindrical part 31 of the shell at a point above the blade 41. It may have a width so as to locate its outermost edge portions from the shell a slightly greater distance than the outermost portions of the blade extend from the shell. The ring 49 may be provided with transverse extending grooves 51 forming cylindrical or curved portions 52 intermediate the grooves 51. Preferably the grooves 51 are formed V-shaped, the opposite side surfaces of each of the grooves sloping at different angles to the radii extending through the lines of intersections of the planes of the side surfaces of the groove. Thus the center lines between the surfaces of the grooves are inclined to the radii in the direction of rotation of the blade 41. The grooves will operate to catch the blades and stalks of grass. The ring thus has a surface that frictionally engages the cut grass and cooperates with the upper portion of the cylindrical part of the surface of the shell 23 to convey the grass laterally to the side of the swath and also affords a further protection to the blade. The ring 49 and the guard 6 afford the maximum possible protection as against injury due to the movement of the blade and protects the blade from contact with all ordinary obstructions or objects.

The vertical shaft 18 of the motor is connected to a horizontal shaft 53 through a pair of beveled gears 54 that are located in a gear housing 50 secured to the top of the shell by the bolts 55. A pair of pulley wheels 56 are connected to the shaft 53 and a pair of belts 57, preferably traction belts formed of rubber or other suitable material, are driven by the wheels 56 to actuate a roller 58. The roller 58 is provided with grooves located in its ends which are adapted to receive the belts 57. The outer surfaces of the belts are preferably toothed to form traction parts that protrude slightly from the lower side of the roller 58 whereby the mower will be drawn forwardly by the operation of the motor. The roller 58 is rotatably supported on the shaft 59. The ends of the shaft 59 are secured in brackets 61 that are connected to the side wall of the shell 2.

A pair of wheels 62 are rotatably supported in brackets 63 that are swiveled on the rivets 64 secured to the top of the shell 2 and are limited in their swiveled movements by the rivets 66 that are secured to the top of the shell and extend through the slots 67 formed in the tops of the brackets. The wheels 62 cooperate with the roller to support the blade 41 in a plane parallel to the supporting surface and in close proximity thereto. The blade is thus located close to the ground and cuts the grass at a uniform distance therefrom. Preferably the under surface of the guard 6 is curved convexedly to deflect any objects, such as small stones, or to enable movement of the blade over projecting sod portions or objects on the surface of the ground. Also a pair of legs 68 are pivotally supported on the shaft 59. They have a length sufficient to raise the roller 58 from the ground whereby the engine may be cranked or operated without forwardly moving the mower.

In the form of construction illustrated in Figs. 7 to 14, the parts of the machine are supported on a frame 71 that is conveyably supported by means of the wheels 72, located at the forward end of the frame 71, and by the guiding wheel 73. The wheels 72 may be provided with suitable lugs or other traction elements to produce forward movement over the surface of the ground. The wheel 73 is connected to a shaft 75 rotatably supported in a bifurcated arm 74 that is pivotally connected to the frame 71. The arm 74 is pivotally supported in a bracket 76 having a suitable king pin 77 or other bearing part to enable swinging movements of the wheel 73 relative to the frame 71 to direct the machine in its movement over the surface of the ground as it is propelled by the wheels 72.

The wheels 72 are driven by a suitable internal combustion engine 78 supported on the frame 71. The crank shaft of the engine is connected to a drive shaft 79 by means of a suitable clutch mechanism that may be operated by a pedal or by a lever, such as the lever and link mechanism 80. The drive shaft 79 is connected to a shaft 81 that is rotatably supported in the brackets 82 connected to the frame 71 of the machine. The connection may be made through the bevel gear wheels 83 and 84 located on the shafts 79 and 81. Bevel gear wheels 86 are connected to the shaft 81 at its ends. The gear wheels 86 mesh with bevel gear wheels 87 that are connected to the shafts 88 rotatably supported in suitable bearings formed in or secured to the frame 71. The lower ends of the shafts 88 are provided with the bevel gear wheels 89 that mesh with ring gears 91 secured to the spokes or web 92 of the wheels 72 to produce rotation of the wheels 72. The wheels 72 are connected to the shafts 93 rotatably supported in the frame 71, whereby forward movement of the machine may be produced upon operation of the clutch to connect the drive shaft 79 with the crank shaft of the engine 78.

The machine may be steered or directed by means of a steering wheel 96. The steering wheel is provided with an arm 97 which is connected with an arm 98 located on the pivoted arm 74. The ends of the arms 97 and 98 are connected together by the link 99 to produce swinging movement of the arm 74 and the wheel 73 to direct the machine by the operation of the steering wheel 96 as the machine is moved by the wheels 72.

The machine is provided with a pair of shells 101 that are connected by suitable spiders 102 to the shafts 88. The shells 101 surround the major parts of the wheels 72 and bent portions of the frame 71 to which the wheels 72 are rotatably connected. The beveled gears 87 mesh with the beveled gears 86 at points located near the outer sides of the gears 87 to cause opposite rotation of the shafts 88 and the shells 101 to which the shafts are connected. The ring gears 91 are located on the inner sides of the wheels 72, and consequently the shafts 88 cause the rotation of the wheels 72 in the same direction. Annular cutting blades 103 are connected to the lower edges of the shells 101. The cross-sectional form of the annular cutting blades 103 is L-shaped. If desired, the lower edges of the shells may be reinforced and correspondingly strengthened by means of the rings 104. The blades 103 and the rings 104 may be pressed into the ends of the shells or otherwise secured in their respective positions.

The annular cutting blades protrude but short distances from beneath the lower edges of the shells 101. They are provided with cutting portions 106 having circular peripheral cutting edges 107 and radially cutting edges 108. The blades are supported in planes substantially parallel to the surface of the ground as the machine is moved. The blades form a platform on which the ends of the cut portions of the stalks rest as the blades are rotated. The speed of rotation of the shells 101 and the blades 103, together with the speed of the forward movement of the machine, is such as to prevent centrifugal displacement of the grass.

The grass is conveyed by the blades and shells to points intermediate the shells 101 and to a platform or plate 109 that may be secured to the frame of the machine. The plate 109 forms a floor on which the grass may be collected in piles or, if the grass is bundled, may be collected in bundles. The blades 103 over-lap in the vicinity of the plate 109, and the grass supported on the blades is delivered to the plate 109. When cutting grass having stalks of considerable length, such as cereal grasses, the shells 101 may be provided with a plurality of projecting fingers 111 for maintaining the stalks upright. They extend through slotted openings 112 formed in the shells. The fingers 111 protrude from the shell about the width of the projecting part of the cutting blades 103. The fingers 111 are located in vertical rows, and the fingers of each row are connected to rods 113 that are rotatably supported in bearings 114 secured to the inner surfaces of the shells 101. The rods 113 may be provided with the heads 116 that engage the upper bearings 114 to support the rods 113 in position within the shells 101. The rods 113 are spring pressed by the spring 117. One end of each of the springs 117 is secured in a hole formed in its associated rod, and the other end 118 of the spring protrudes from the rod 113 to engage the inside surface of the shell. The springs 117 operate to yieldingly press the fingers 111 against the leading edges of the slotted openings 112. The springs permit the fingers 111 to yield against the pressure that is produced when the cut stalks are delivered to the frame of the machine.

The machine is provided with a pair of guiding plates 121 and 122. The edges of the plates 121 and 122 are located in close proximity to the exterior surfaces of the shells 101 and operate to collect the grass as it is conveyed by the shells to the space intermediate the shells. Either the grass is moved frictionally by the rotating surfaces of the shells, and also by the fingers 111. The grass is pushed inwardly between the plates 121 and 122 onto the platform or plate 109 by the fingers 111 until they engage the forward end edges of the plates 121 and 122 that swing the fingers 111 toward the following end edges of the slots 112 and into the shells 101. Thus, the grass may be pushed through the space between the plates 121 and 122 and gathered on the plate 109 or upon a rotatable platform that may be pushed around as the grass is pressed rearwardly from the shells by the fingers that collect the grass. Thus, the grass may be collected in a pile or the stalks may be gathered while in their upright positions by the fingers 111 and may be moved onto the plate 109.

The plate 109 may be cut to receive a circular platform 123 rotatably supported on rollers 126 that are rotatably supported on the frame 71 and distributed in spaced relation below the platform 123. The axes of the rollers 126 are located in lines extending radially from the center of rotation of the platform 123. A plate 124 may be located in a centrally disposed opening 125 formed in the circular platform 123. The plate 124 has a raised edge portion 130 that over-laps the inner edge of the circular platform 123 and guides the platform 123 in its rotation. Consequently, as the grass is pushed through the space between the plates 121 and 122 by the fingers 111, it is deposited on the circular platform 123, and by the continued crowding of the grass onto the platform, the platform will be rotated until the platform 123 is substantially loaded whereupon the accumulated grass may be pushed from the platform.

In the particular form of construction shown in the drawings, means is provided for bundling the grass stalks as they are forced between the plates 121 and 122 by the fingers 111. The plates 121 and 122 are bent to locate their grass delivering edges remote from each other. Preferably the forward portions 127 and 128 of the plates 121 and 122 are located substantially parallel while a greatly enlarged space is formed intermediate their rearwardly extending portions 129 and 131. Within the space between the portions 129 and 131 is located a rotatable gate 132 having vertically and radially extending wings 133. The gate 132 is rotatably supported on the rod 134 that may be connected to the frame 71 of the machine. Preferably the winged gate is rotatably supported to yieldingly resist rotation to enable collection of the grass and to insure filling of the spaces between the wings of the gate and the plate 122 by the operation of the fingers 111. The rear and forward portions 128 and 131 of the plate 122 extend in substantially the same plane. The rear portion 131 of the plate, however, curves slightly from the plane of the forward portion 128. The portion 129 of the plate 121 is bent laterally and curvedly to form a pronounced angle between the forward portion 127 and rear portion 129 of the plate. The gate supporting rod 134 is located near the plane of the forward portion 127 of the plate 121 so that the grass will engage the wings 133 of the gate 132 in succession to rotate the gate and direct the grass along the portion 131 of the plate 122 and over the surface of the platform 109 and onto the circular platform 123.

The machine is provided with a means for discharging the grass from the machine. Preferably a conical receiving drum is located above the rotatable part of the platform. The drum may be located at any suitable height above the platform and may be adjusted in height according to the length of the grass stalks collected. Where the grass is conveyed beneath the drum in the form of piles, the drum may be lowered or otherwise positioned to sweep the pile from the machine and deposit it along the swath that has been cut by the machine, or the drum may be provided with a gate for admitting upright stalks of the grass as they are crowded together by the operation of the fingers of the shells. When the drum has been filled, the drum may be laterally moved to slide the grass from the platform and deposit it on the ground. Where cereal grasses are gathered and their stalks are maintained upright, the conical form of the drum tilts the stalks inwardly and holds them tilted on the platform and enables ready discharge of the stalks. If the stalks are bundled, the drum forms them into shocks, and the shocks may be discharged and bodily set in shock form on the ground.

In the form of construction shown, a conical drum 138 is supported by means of a pair of arms 139 upon a pair of uprights 141. The arms 139 are connected to a rod 142 that is pivotally supported in the upper ends of the uprights 141. An arm 143 is connected to one end of the rod 142 for rotating the rod and swinging the arms 139 and the drum 138 rearwardly to move the accumulated grass from the machine and over a rearwardly extending plate 144 that may be inclined toward the ground.

A link 146 is connected to the arm 143 and to a wheel 147 rotatably supported on the shaft 75. The connection to the wheel 147 may be made by means of the round headed pin 148 that forms a universal joint. The wheel 147 is centrally and circularly recessed, and a disc 149 is located within the recess of the wheel 147 and is keyed to the shaft 75 and rotated by the wheel 73. The wheel 147 is provided with a spring pressed dog 151 that extends through the flange of the wheel formed by its centrally recessed part for engagement in a notch 152 formed in the disc 149, to cause rotation of the wheel 147 with the wheel 73 when the dog 151 engages in the notch 152. A cam 153 is connected to a rod 154 that is rotatably supported in a bracket 155. The rod 154 is connected to a rod 157 by means of the universal joint 156 that is rotatably supported in brackets 158 and connected to the frame 71 of the machine or to the platform 159. The end of the rod 157 is connected to a pedal 161 for rotating the rod 157, and the cam 153. The dog 151 is spring pressed downwardly by a spring 150 secured at one end to the wheel 147 and at the other end to the dog 151. Rotation of the cam 153 releases the spring pressed dog 151 and allows it to rest on the periphery of the disc 149 until, upon the rotation of the wheel 73 and the disc 149, the notch 152 registers with the end of the dog 151, whereupon the dog 151 engages in the notch 152, and the wheel 147 is rotated with the disc 149. Upon rotation of the wheel 147, the link 146 is drawn downwardly which swings the arms 139 to swing the drum 138 rearwardly and move the accumulated grass, either in the form of a pile or cock, over the plate 144 to the ground. The plate 144 is preferably pivotally connected to the frame 71 by a pivot pin 160 and may be suitably spring pressed by a spring 162 to normally maintain the outer edge of the plate 144 remote from the surface of the ground. The weight of the grass, that is pushed over the plate, tilts the plate to lower its outer edge to near the ground during the discharge of the grass from the machine and thus operates to guide the grass to the ground.

Upon movement of the dog 151 from the cam 153 by rotation of the wheel 147, the pedal 161 may be released. The pedal 161 is spring pressed and returns the cam 153 to its normal position. The cam 153 has a curved edge portion 163 that engages the head of the dog and operates to lift the dog from the notch 152 upon the completion of the rotation of the wheel 147, that is, upon the completion of the return of the drum 138 to its normal position. The edge of the cam 153 may be notched to engage the dog and prevent continued movement of the wheel. Return of the drum to its normal position locates the centers of the wheel 147, the pin 148, and the point of connection of the link 146 with the arm 143 in line and operates to retain the drum 138 in its normal position.

Where cereal grass is cut and the stalks maintained upright, the stalks may be bundled as they pass the gate 132, and the bundles may be pushed into the drum, preferably through a swinging gate formed in the side of the drum. Also a telescopic or slidable pedestal or other contractible guiding or grass confining element may be used to cooperatively maintain the stalks or bundles upright. In the form of construction shown, a conical spring 166 has one end secured to the plate 124. The other end of the spring 166 is connected to one end of a flexible cable 168 that extends axially through the conical spring and downwardly through the plate 124 and over the pulley wheels 169 and 171. The other end of the cable 168 is connected to a drum 172. The drum 172 is mounted on a shaft 173 that is rotatably supported in the brackets 174. A pinion 176 is also mounted on the shaft 173, and the pedal 161 has a sector gear 177 that engages the pinion 176. Upon operation of the pedal 161 to release the dog 151, the sector gear 177 operates the pinion 176 to rotate the drum 172 and draw the spring 166 to the surface of the plate 124 to prevent interference of the sliding movement of the grass as it is moved from the machine by the operation of the drum 138. When the drum 138 has completed its movement to discharge the grass from the machine, the pedal 161 is released, and the spring 166, operating through the pinion 176 and the sector gear 177, returns the pedal 161 and the cam 153 to their normal positions. The edge of the cam is then in position to engage the dog 151 at a point just in advance of the completion of the rotation of the wheel 147 to raise the dog from the notch of the disc 149. The conical spring 166 coacts with the conical drum to tilt the upright stalks inwardly.

When the upright stalks are pushed intermediate the wings 133 of the gate 132 to substantially fill the space between two of the wings and the plate 122, they may be bundled and tied together by a suitable bundle mechanism. The details of the bundle mechanism form no part of the invention, and any one of a number of the well-known bundle mechanisms may be used. A ball or spindle of twine, such as the twine 178, may be supported on the frame 71 to enable unwinding movement of the ball or spindle. The twine 178 extends across the wing 133 located in proximity to the curved portion 129 of the plate 121 to a knotting mechanism enclosed in the shell or housing 179 and located on the outer side of the plate 122 and so that the twine 178 extends across the space formed by the forward portions 127 and 128 of the plates 121 and 122. As the upright stalks of grass are pushed along the space between the plates 121 and 122, the twine is pushed inwardly by the stalks until a sufficient number of the stalks have been gathered to form a bundle whereupon an arm 181, frequently referred to as the needle arm, is oscillated to catch the twine in the vicinity of the bend of the plate 121 and to draw the twine 178 from the spindle to the housing 179 where the end portions of the part of the twine that surrounds the stalks collected in the region of the gate 132 are knotted together, and the twine is cut and held, so that the portion that is drawn by the needle arm 181 is held in the housing 179 until the arm 181 is again operated to make the succeeding bundle. The tying mechanism is actuated by means of a shaft 182 that is connected by a sprocket wheel 183 and a sprocket chain 184 connected to a sprocket wheel located on one of the vertical shafts 88. The shaft 182 is supported in bearings formed in the frame 71 of the machine. A sleeve 186 is located on the shaft 188, and the shaft and sleeve are provided with clutch engaging members 187 that are spring pressed and biased to clutch-open positions and may be brought into a clutch engagement by the pedal 188. The pedal 188 is connected to a shaft 189 that is rotatably supported in brackets 191 and 192 that are supported on the frame 71 of the machine. An arm 193 is connected to the pedal 188. The end of the arm 193 is provided with a roller 194 that engages one of the clutch members 187. Depression of the pedal 188 will cause rotative movements of the sleeve 186 with the shaft 182. The needle arm 181 is connected by a suitable cam 196 to the sleeve 186 so that the rotative movements of the sleeve will cause the needle arm 181 to produce an oscillatory movement. Release of the clutch 187 upon the completion of the return oscillatory movement of the needle arm 181 locates a portion of the twine in position across the space between the plates 121 and 122.

In order to insure completion of the operation of the knotting mechanism after the return movement of the needle arm 181, the clutch 187 is automatically disconnected upon a complete rotation of the cam 196, the arm 181 having completed its return movement in advance of the operation of the knotting mechanism. A dog 201 is pivotally connected to one of the clutch members 187, connected to the sleeve 186, and engages in a groove 202 formed in the other clutch member 187 connected to the shaft 182. A cam 203 is connected to the end portion 131 of the plate 122 and engages an arm 204 connected to the dog to tilt the dog and disconnect the clutch members 187 upon completion of the rotation of the cam 196 to locate the arm 181 in its normal position. The sleeve 186 has a sprocket wheel 206 to which the sprocket chain 207 is connected. The sprocket wheel 206 operates the knotting and twine cutting mechanism contained in the housing 179 subsequent to the return of the arm 181. The parts of the knotting mechanism and the needle arm are maintained in their normal positions until the pedal 188 is again operated.

Thus the bundles are crowded towards the circular platform 123 within the area of the drum 138 by the fingers 111 until a number of the bundles are located in their upright positions on the rotatable platform about the spring 166 whereupon depression of the pedal 161 will cause the drum 138 to discharge the bundles. Preferably the drum 138 is disposed well below the tops of the brass and forms a shock of the bundles as they are moved into the drum. In order to admit the bundles into the drum, the drum is provided with a gate 211 that is pivotally connected to the body of the drum by means of the pin 212 and the hinges 213. The gate 211 may be spring pressed by means of the spring 214 that is provided with end parts 215 that engage, one the body of the drum, and the other the surface of the gate to yieldingly maintain the gate closed. The width of the gate is substantially the same as the distance between the end of the portion 131 of the plate 122 and the point at which the succeeding wings 133 of the gate 132 normally take as each bundle is pressed through the gate. The hinges of the gate are located at the end of the gate near the end of the portion 129 of the plate 121 to direct the bundles toward one side of the drum and the spring 166 to produce counter-clockwise rotation of the rotatable platform 123, when viewed as shown in Fig. 9, by the operation of the fingers 111 as they push the stalks and bundles formed thereof toward the rotatable platform. Thus the bundles are formed and forced into the drum and onto the circular platform 123 until it is filled, whereupon the pedal 161 may be operated for the discharge of the bundles from the machine to deposit them on the ground in the form of shocks.

I claim:

1. In a grass cutter, a shell having a cylindrical part, a grass cutting blade part located at the lower edge of the cylindrical part, means for rotating the shell about a substantially vertical axis to cut and gather the cut portions of the grass on the surface of the cylindrical part of the shell and forwardly moving the shell over a supporting surface to maintain the cut grass on the surface of the shell and to deflect cut portions of the grass at one side of the swath cut by the blade part.

2. In a grass cutter, a shell, rotative supporting members connected to the shell for conveying the shell and enclosed within the shell, a second shell surrounding the first named shell and having a cutter part extending along the lower edge of the said second shell, the cutter part having peripherally located cutting edge portions, means supported on the first named shell for moving the grass cutter over the supporting surface and connected to the second shell for rotating the said second shell.

3. In a grass cutter, a shell, rotative supporting members connected to the shell and enclosed therein, a motor connected to the rotative members for conveying the shell, means for supporting the motor on the shell, a second shell surrounding the first named shell and connected to the shaft of the motor, the lower edge of the second shell having a projecting cutting part.

4. In a grass cutter, a shell, a grass cutting part, means for rotating the shell and operating the grass cutting part, the shell having a grooved ring located above the blade for maintaining the grass in upright positions, and means for deflecting the grass from the said projecting parts.

5. In a grass cutting machine, a circular blade part, means for rotating the blade part, means for maintaining the cut portions of the grass substantially upright, means for collecting the grass in its upright position on the machine, means for forming bundles of the cut portions of the grass as they collect on the machine, means for forming cocks of the bundled portions of the grass, and means for discharging the cocks from the machine to the ground.

6. In a grass cutting machine, a pair of shells, the lower edges of the shells having grass cutting parts, means for rotating the shells in opposite directions, means carried by the shells for gathering the grass as it is cut and conveying it intermediate the shells, a rotatable platform for receiving the grass, and means for discharging the grass from the machine.

7. In a grass cutter, a shell having a substantially cylindrical part, means for rotating the shell and moving the shell over the ground, the lower edge of the cylindrical part of the shell having a grass cutting part, the outermost cutting edges of the cutting part located in proximity to the lower end of the cylindrical part of the shell to deposit the severed parts of the grass on the surface of the shell by the movement of the shell over the ground and conveying the grass by frictional contact with the shell to one side of the swath cut by the grass cutter whereby the rotation of the shell and the said movement of the shell over the ground will cause the grass to be discharged from the shell.

8. In a grass cutter, a shell having a cylindrical part, the lower edge of the cylindrical part of the shell having a grass cutting part, the outermost cutting edges of the grass cutting part located in proximity to the lower edge of the cylindrical part of the shell, the shell having a circular ridge located above the cutting edges and near the lower end of the cylindrical part of the shell and protruding from the shell substantially the same distance that the outermost cutting edges protrude from the surface of the shell.

9. In a grass cutter, a shell having a cylindrical part, the lower edge of the cylindrical part of the shell having a grass cutting part, the shell having a circular ridge near the lower edge of the cylindrical part of the shell and protruding from the shell substantially the same distance that the outermost cutting edges protrude from the surface of the shell, the ridge having grooves extending parallel to the axis of the shell, means for rotating and laterally moving the shell.

10. In a grass cutter, a frame, a shell having a cylindrical part, the lower edge of the cylindrical part having a grass cutting part, means for rotating and laterally moving the shell, an annular shoe supported on the frame and located below and contiguous to the cutting part, and protruding from the shell substantially the same distance that the innermost cutting edges of the cutting part protrude from the lower edge of the cylindrical part of the shell.

11. In a grass cutter, a frame, a shell, the lower edge of the shell having a grass cutting part, means for rotating and laterally moving the shell, an annular shoe supported on the frame and located below and contiguous to the cutting part and protruding from the shell substantially the same distance that the innermost cutting edges of the cutting part protrude from the lower edge of the shell, the shell having a circular ridge located near the cutting part and protruding from the shell substantially the same distance that the outermost edges protrude from the shell.

12. In a grass cutter, a frame, a shell rotatably supported on the frame, a cutting member having a laterally protruding narrow blade and a flange part, the flange part substantially fitting the lower part of the shell.

13. In a grass cutter, a frame, a shell rotatably supported on the frame, a cutting member having a laterally protruding narrow blade and a flange part, the flange part substantially fitting the lower part of the shell, an annular shoe supported on the frame and having a curved lowermost surface, and means for rotating the shell relative to the shoe.

14. In a grass cutter, a frame, a shell, the lower edge of the shell having a grass cutting part, a vertically extending shaft connected to the shell and rotatably supported in the frame, a motor means supported on the frame for rotating the shaft, supporting wheels mounted on the frame and located within the shell, and means for connecting the wheels to the shaft to actuate the wheels and convey the frame over a supporting surface.

15. In a grass cutter, a frame, a shell, the lower edge of the shell having a grass cutting part, a shaft rotatably supported in the frame and connected to the shaft, an internal combustion engine connected to the shaft for rotating the shaft, wheels located within the shell for supporting the frame and conveying the frame over a supporting surface, a fan connected to the shaft, an air-deflecting plate supported on the frame for directing air from the fan to the engine.

16. In a grass-cutting machine, a circular blade, means for rotating the blade, a grass-conveying means carried by the machine for conveying the grass as it is cut by the blade, and a rotatable platform for receiving the grass from the conveying means and rotated by the conveying means as the grass is received.

17. In a grass-cutting machine, a circular blade, means for rotating the blade, a grass-collecting means carried by the machine for collecting the grass cut by the blade, means movable with the blade for conveying the cut grass to the collecting means, means operated by the conveying means for dividing the cut grass into substantially equal portions, a rotatable platform for receiving the grass from the collecting means, and manually controlled means operated by the machine for discharging the said divided portions from the machine.

BERTIS H. URSCHEL.